United States Patent
Lo

(10) Patent No.: US 9,965,045 B2
(45) Date of Patent: May 8, 2018

(54) CHINESE INPUT METHOD USING PINYIN PLUS TONES

(71) Applicant: Hoi Chiu Lo, Hong Kong (HK)

(72) Inventor: Hoi Chiu Lo, Hong Kong (HK)

(*) Notice: Subject to any disclaimer, the term of this patent is extended or adjusted under 35 U.S.C. 154(b) by 136 days.

(21) Appl. No.: 15/012,822

(22) Filed: Feb. 1, 2016

(65) Prior Publication Data

US 2016/0239099 A1 Aug. 18, 2016

(30) Foreign Application Priority Data

Feb. 12, 2015 (CN) .......................... 2015 1 0075535
Aug. 11, 2015 (SG) ............................ 10201506266T

(51) Int. Cl.
| | |
|---|---|
| G09G 1/00 | (2006.01) |
| G06F 3/01 | (2006.01) |
| G09B 19/08 | (2006.01) |
| G09B 13/02 | (2006.01) |
| G09B 19/06 | (2006.01) |

(Continued)

(52) U.S. Cl.
CPC ............ *G06F 3/018* (2013.01); *G06F 3/0233* (2013.01); *G06F 17/2223* (2013.01); *G06F 17/276* (2013.01); *G09B 13/02* (2013.01); *G09B 19/06* (2013.01); *G09B 19/08* (2013.01)

(58) Field of Classification Search
CPC ... G06F 3/01; G06F 17/28; G06F 3/02; G06F 3/018; G06F 17/2223; G09B 19/08
See application file for complete search history.

(56) References Cited

U.S. PATENT DOCUMENTS

2014/0081622 A1* 3/2014 Ogawa .................... G06F 17/28
704/8

FOREIGN PATENT DOCUMENTS

| | | |
|---|---|---|
| CN | 1111373 A | 11/1995 |
| CN | 1074553 C | 11/2001 |

(Continued)

OTHER PUBLICATIONS

Office Action of CN 201510075535X issued from the State Intellectual Property Office of the People's Republic of China dated Jan. 31, 2018, including a search report of the same.

*Primary Examiner* — Michael Faragalla

(74) *Attorney, Agent, or Firm* — Spruson & Ferguson (HK)

(57) ABSTRACT

This invention discloses a Chinese input method using Pinyin plus a new tone notation on a Western keyboard or keypad to input Chinese characters, characterized in that the user can input a Chinese compound word (polysyllabic word) containing several syllables and tones by just keying in a series of letters representing the syllables and tones of the word, and the letters are all joined together without causing any confusion. This feature is attributed to the new tone input method of this invention, which is characterized in that the three letters j, q and x are used to input three of the four tones of Putonghua (Mandarin), and "no entry" is used to input the remaining tone. There is a detailed logical reasoning in the specification of this patent application explaining how this method can achieve the feature of "syllables with tones are joined together without causing confusion". Input of these syllables with tones via just a Western keyboard, together with the important feature of "the syllables with tones are joined together without causing confusion", will have a major impact on the technical field of Chinese input method.

6 Claims, 1 Drawing Sheet

(51) Int. Cl.
    *G06F 3/023*         (2006.01)
    *G06F 17/22*         (2006.01)
    *G06F 17/27*         (2006.01)

(56) References Cited

FOREIGN PATENT DOCUMENTS

| | | |
|---|---|---|
| CN | 1171137 C | 10/2004 |
| CN | 101055501 A | 10/2007 |
| CN | 102320875 B | 11/2013 |
| CN | 104020859 A | 9/2014 |

\* cited by examiner

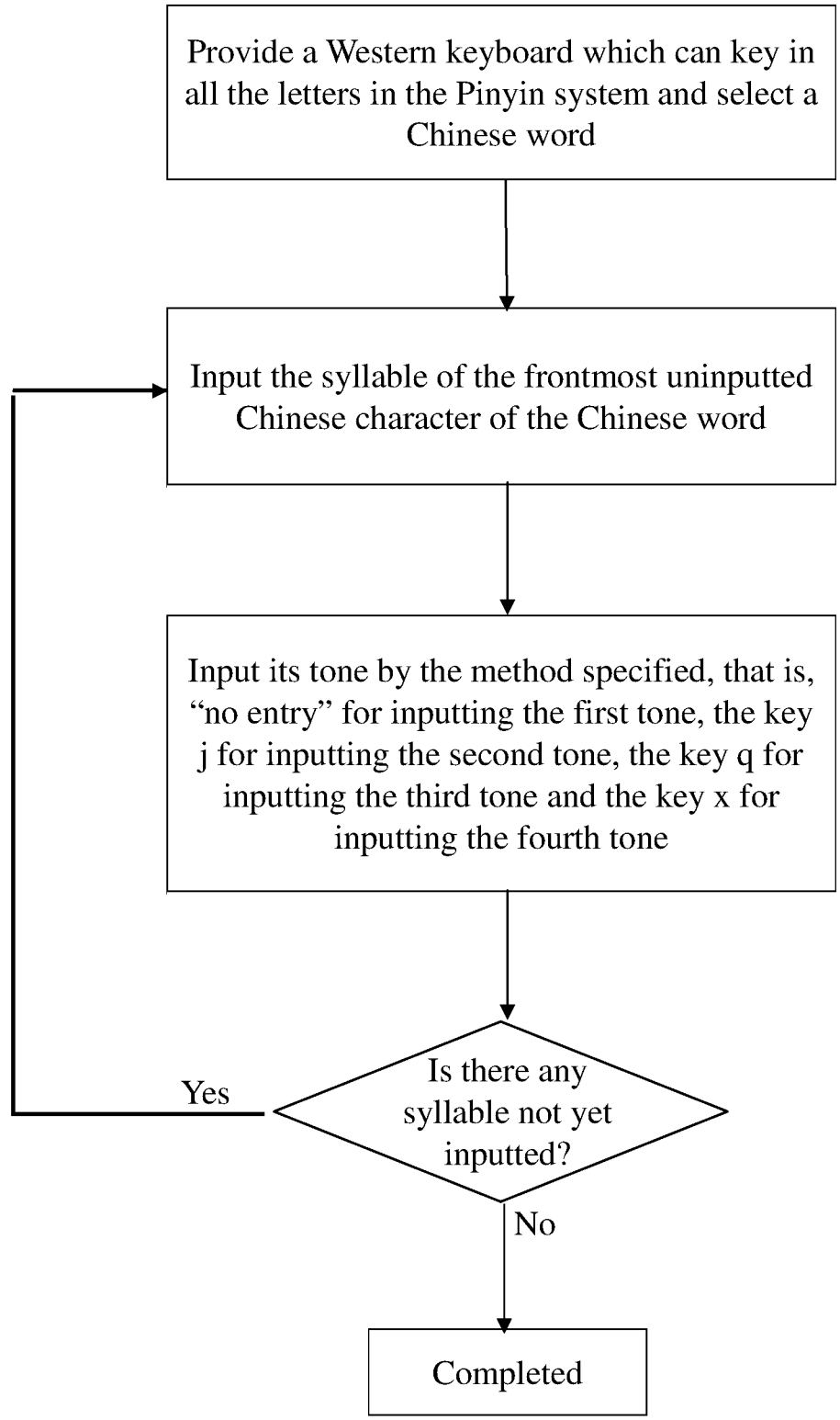

CHINESE INPUT METHOD USING PINYIN PLUS TONES

CROSS REFERENCE TO RELATED APPLICATION

This is a non-provisional patent application which claims benefit from China invention patent application number 201510075535.X filed Feb. 12, 2015, and Singapore patent application number 10201506266T filed Aug. 11, 2015, and the disclosure of which is incorporated herein by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to a Chinese input method, which uses Pinyin plus tones on a Western keyboard or keypad or equivalent to input Chinese characters and compound words.

BACKGROUND ART

Currently, except for the input method using handwriting on mobile device or touch pad such as on a tablet, the Chinese input methods using keyboard mainly include the Pinyin input method and the Five-Stroke input method (excluding the Zhuyin-Symbol input method used only by the Taiwanese). Most Chinese people have learnt Pinyin, so Pinyin input method is obviously in a dominant position, for the Chinese users can use the input method directly with no more learning required. As a matter of fact, although considerable time and effort are needed to learn and master the Five-Stroke, it is still widely used by people in China. The main reason for this is that the current Pinyin spellings used by the Pinyin input method only express syllables without tones. Today, the most popular Pinyin input methods are developed by large companies like Baidu, Sogou, Tencent QQ, Microsoft and Google, and all these methods let the user select the wanted Chinese character or word immediately after inputting the syllable spelling without the tone.

Mandarin Chinese has only about 410 syllables (not containing tones), but there are more than 3,000 commonly used Chinese characters, so when selecting the wanted Chinese character after inputting a syllable without tone, the user has to face an average of about 8 different commonly used Chinese characters (3300÷410, assuming there are a total of 3,300 commonly used Chinese characters). When inputting a character that is not commonly used, the selection situation is even worse. In general, the computer displays five characters for the user to choose from each time, and a key has to be pressed to display the next five, and so on. So it is quite time-consuming, and the selection situation is far worse than that of the Five-Stroke input method. Computer technology will, of course, place the more appropriate Chinese characters in the front to facilitate selection, but the help is limited.

Chinese patent No. ZL94117853.6 provides an HLV Pinyin input system, which uses the standard Western keyboard to input Chinese characters, inputting their syllables by their Pinyin spellings and their tones by the three letters h, l and v, with "no entry" representing the first tone, and h, l, v representing the second, third and fourth tones respectively. In this way, the invention allows simultaneous input of syllables and tones of Chinese characters to reduce repeated codes, thereby reducing the Chinese character selection time and improving the input speed. However, because inappropriate letters h, l and v are used to represent the tones in this invention, syllable boundary confusion occurs (see the disclosed specification of the invention from the bottom of Page 2 to the top of page 3). To remedy the confusion in this invention, extra letters need to be used to represent the four tones under different situations, so in addition to the letters h, l and v, extra letters y, w, r and k are used to represent the tones, resulting in complicacy (see claims 4-7 of the patent). Moreover, in addition to placement at the end of the syllable spellings, these letters representing the tones may sometimes need to be placed in other positions such as in front of n or ng.

No. ZL00119308.2 Chinese patent provides an improved HLV Pinyin input system. As before, it uses the standard Western keyboard to input Chinese characters. But in order to go further to reduce repeated codes, the invention introduces basic codes for the radicals of Chinese characters, so that it can simultaneously input the syllables, the tones and the radicals of Chinese characters. However, more than 240 radicals need to be set for this method, and each radical has its own basic code. This method successfully solves the problem of repeated code, but it becomes much more complex than before and is difficult to learn.

SUMMARY OF THE INVENTION

In view of the above problems, this invention discloses a Chinese input method using Pinyin plus a new tone notation. It uses the three letters j, q and x to represent three of the four tones of Mandarin, and "no entry" to represent the remaining tone. This method greatly reduces repeated codes, improves input speed and is simple to learn.

According to one aspect of this invention, a Chinese input method using Pinyin plus a new tone notation, operated on a Western keyboard or keypad to input Chinese words in terms of Chinese characters, such that after a user inputs a Chinese word containing one or several syllables and tones by keying in a series of letters representing the syllables and the tones of the word, the letters are all joined together but do not cause any confusion, wherein the input method comprises the steps of:

providing the Western keyboard or keypad used to key in all the letters used by a Pinyin System;

providing a computer software for inputting Chinese via using the Western keyboard or keypad, the computer software being configured such that the three keys j, q and x, are used to input three of the four tones of Putonghua or Mandarin while "no entry" is used to input the remaining tone, wherein said computer software, making use of the fact that said Chinese input method allows the letters, representing the syllables and tones of the word, to be all joined together without causing any confusion, is also configured such that after a Chinese word containing several syllables and tones is inputted, a computer screen instantaneously displays, in terms of Chinese characters, a list of commonly used Chinese words that have the same sound and the same tone as the inputted word for the user to select;

using the Western keyboard or keypad to input a syllable without tone of a first Chinese character of the Chinese word;

after the syllable without tone of the first Chinese character is inputted, inputting a tone of the first Chinese character by keying in one of the letters j, q and x, or by "no entry", thereby generating the syllable and the tone of the first Chinese character;

if the Chinese word has only one character, terminating input process of the input method;

if the Chinese word contains more than one character, repeating the step of generating the syllable and the tone of the first Chinese character, which comprises inputting a syllable without tone of a second Chinese character of the Chinese word, followed by inputting a tone of the second Chinese character by keying in j, q or x, or by "no entry", to thereby generate the syllable and the tone of the second Chinese character;

repeating the steps above until the syllables and tones of all the characters of the Chinese word are inputted;

selecting a suitable Chinese word from the list of corresponding commonly used Chinese words already displayed on the computer screen in terms of Chinese characters.

Preferably, "no entry" is used to express the first tone (level tone) of Putonghua or Mandarin, the key j is used to input the second tone (rising tone) of Putonghua or Mandarin, the key q is used to input the third tone (falling-rising tone) of Putonghua or Mandarin and the key x is used to input the fourth tone (falling tone) of Putonghua or Mandarin.

Preferably, said input method further comprises the step of:

using a plurality of the Chinese words containing tones, which are monosyllables, disyllables or polysyllables, to constitute a sentence or a paragraph containing several sentences, wherein the syllables containing tones in every word of the entire sentence or paragraph are joined together without causing any confusion.

Preferably, said input method further comprises the step of:

when the Western keyboard or keypad is used to input the syllables of the Chinese characters, using letters e and v to substitute the two letters ê and ü respectively in the Pinyin System, wherein the substitution enables implementation of the input method on a pure English keyboard.

According to still another aspect of the invention, a computer-implementable method for converting Western alphabet spellings representing Chinese words, sentences, paragraphs or articles into Chinese characters in writing or voice, wherein letters j, q and x appearing in said Western alphabet spellings are used to represent three of the four tones of Putonghua or Mandarin.

According to a further aspect of the invention, a computer-implementable method for converting Chinese words, sentences, paragraphs and articles composed of Chinese characters in writing or voice into Western alphabet spellings, wherein letters j, q and x are used to represent three of the four tones of Putonghua or Mandarin.

DESCRIPTION OF THE DRAWINGS

Through the following drawing(s), this invention will be better understood by those skilled in the art, and its advantages will be more clearly illustrated. The drawing(s) described here is/are only used to illustrate selected embodiments, which neither cover all possible embodiments nor is/are intended to limit the scope of this invention.

FIG. 1 is a flowchart of the Chinese input method using Pinyin plus tones according to an embodiment of this invention.

DETAILED DESCRIPTION OF THE PREFERRED EMBODIMENTS

Embodiment 1

Embodiment 1 of this invention is characterized in that "the tone of a Chinese character is inputted through keying in the letter j, q or x or no entry", so that "the user can input a Chinese compound word containing several syllables and tones by just using the letter keys, and the letters representing the syllables and tones of the Chinese compound word are all joined together without causing any confusion".

Embodiment 1 does not specify which specific letters represent which specific tones.

Embodiment 2

Embodiment 2 clearly specifies that "no entry" is used to express the first tone (level tone), the key j is used to input the second tone (rising tone), the key q is used to input the third tone (falling-rising tone) and the key x is used to input the fourth tone (falling tone). Obviously, Embodiment 2 is just an embodiment covered by Embodiment 1. For the sake of convenience, Embodiment 2 is used to demonstrate only the procedures of inputting a Chinese compound word containing several syllables and tones by using just the letter keys, with the four tones of Mandarin represented by the letters j, q, x or "no entry"; and as for the reason why confusion will not occur even when the several syllables and tones are joined together, explanation will be made later. As shown in FIG. 1, the input process is as follows:

Provide a Western keyboard which can key in all the letters in the Pinyin system;

Use the Western keyboard to input the syllable of the first Chinese character of the Chinese word or compound word (not containing the tone yet);

After the syllable of the first Chinese character is inputted, input its tone by the method specified above, that is, "no entry" for inputting the first tone (level tone), the key j for inputting the second tone (rising tone), the key q for inputting the third tone (falling-rising tone) and the key x for inputting the fourth tone (falling tone), thereby generating the first syllable containing a tone;

If the Chinese word has only one syllable, the input process ends here; if the Chinese word is a compound word containing more than one syllable, repeat the said steps used to generate the first syllable containing a tone (i.e., input the syllable of the second Chinese character, and then input its tone in the same way), thereby generating the second syllable containing a tone;

Repeat the said steps until all the syllables containing tones of the Chinese compound word have been inputted.

Now, a Chinese compound word of three syllables, 普通话 (Pinyin: Pǔtōnghuà), which contains three tones, namely, the third tone, the first tone and the fourth tone in sequence, is selected as an embodiment to demonstrate again the said steps above:

Provide a Western keyboard which can key in all the letters of the Pinyin System;

Use the Western keyboard to input the syllable spelling (Pu) of the first Chinese character 普 (Pinyin: Pǔ) of the Chinese word 普通话. After "Pu" is inputted, input its tone (the third tone) by the method specified above, that is, "no entry" for the first tone, the key j for the second tone, the key q for the third tone and the key x for the fourth tone, thereby generating the first syllable containing a tone: "Puq".

Repeat the step used to generate "Puq" above for the next syllable, i.e., input the syllable spelling (tong) of the second Chinese character 通 (Pinyin: tōng), and then input its tone (the first tone) in the same way, thereby generating the second syllable containing a tone: "tong".

Repeat the same step for the next syllable, i.e., input the syllable spelling (hua) of the third Chinese character 话 (Pinyin: huà), and then input its tone (the fourth tone) in the same way, thereby generating the third syllable containing a tone: "huax".

Now that all the three syllables containing tones are inputted and are all joined together, the new spelling "Puqtonghuax" for the Chinese word 普通话 (Pinyin: Pǔtōnghuà) designed by this invention is generated. At this point, the demonstration of the embodiment is completed.

Below is the explanation for why inputting the four tones of Chinese characters through keying in the letter j, q, x or "no entry" for each tone can avoid confusion when the syllables containing tones are joined together, regardless of the number of such syllables. For the confusion mentioned here, the best example is the syllable boundary confusion found in the said "HLV Pinyin Input System" (Chinese invention patent No.: ZL94117853.6). This confusion occurs because the system has selected inappropriate letters to represent tones. A lot of work was done to remedy the situation, and this made the system very complicated.

To explain why the selection of the letters j, q and x to represent the tones can avoid confusion when the syllables of Chinese words containing tones are joined together, by way of illustration is not appropriate, because even when one thousand successful examples are illustrated, the success of the next example still cannot be guaranteed. Therefore, this principle must be explained through logical reasoning.

Firstly, it is necessary to set the tone input method for our explanation, and any method consistent with "the keys j, q and x are used to input three of the four tones, and "no entry" is used to input the remaining tone" as described in Embodiment 1 can be employed. Without loss of generality in the reasoning, the specification described in Embodiment 2 can be employed in the explanation, that is, "no entry" is used to express the first tone, and the keys j, q and x are used to input the second, third and fourth tones respectively. Now, assume that there is a polysyllabic Chinese word, all the syllables and tones of which have been inputted and joined together in sequence through a Western keyboard according to all the steps described in Embodiment 2, just like the said embodiment 普通话 (Pinyin: Pǔtōnghuà). Without loss of generality in the reasoning, it can be assumed that the number of syllables of the Chinese word is four, that it, the Chinese word is composed of four syllables containing tones joined together.

As a matter of fact, no syllable spelling ends with j, q or x in the Pinyin system. So, if there is a letter j, q or x following the last syllable (the fourth syllable), the letter certainly represents the tone of the fourth syllable; and if there is not any such letter following the fourth syllable, then the tone of the fourth syllable must be the first tone. Thus, the tone of the fourth syllable is determined with no confusion.

Now take a look at the other three non-last syllables. The situation for each of the three is the same, that is, each syllable is followed by another syllable. Again, as no syllable spelling ends with j, q or x in the Pinyin system, any of these three syllables can only be followed by at most two of the j, q, x letters (repetition of same letter counted as two). In such case, the tone of any of these three syllables can be uniquely determined by the following method with no confusion:

(1) If no j, q, x letters appear at the end of the syllable, then obviously the tone of the syllable is the first tone for having "no entry";

(2) If only one j, q, x letter appears at the end of the syllable followed by i or u, then the tone of the syllable is also the first tone for having "no entry, because in the Pinyin system, no syllable spelling starts with i or u, and so this j, q, x letter is just the front consonant of the next syllable;

(3) If only one j, q, x letter appears at the end of the syllable not followed by i or u, then the letter certainly represents the tone of this syllable rather than the front consonant of the next syllable, because in the Pinyin system, when j, q or x serves as a front consonant of a syllable, it must be followed by i or u;

(4) If two of the j, q, x letters appear at the end of the syllable, then obviously the former represents the tone of the syllable, and the latter is the front consonant of the next syllable.

The above reasoning covers every possible position and number of the letters j, q and x appearing in a compound word whose syllables containing tones are all joined together, and hence completes the proof of the characteristic of this invention: "A Chinese compound word in pinyin with tones inputted through keying in j, q, x or no entry is characterized in that all the syllables of the compound word can be joined together without causing any confusion".

In addition, as the above reasoning does not involve the four letters e, ê, v and ü, so when a Western keyboard is used to input syllables of Chinese characters, even if the two letters ê and ü in the Pinyin system are replaced by the two English letters e and v respectively, the validity of the above reasoning will not be damaged.

The entire Mandarin language has only about 1,300 differentiable speech sounds, all of which come from only about 410 syllables spoken at different tones. To express Mandarin in Pinyin, it is necessary to mark the tones; otherwise, it is difficult to understand. Since the syllables in Pinyin are represented by Western alphabets, the right approach is that the tones of the syllables should also be represented by Western alphabets. However, there is a significant technical difficulty for this approach, that is, syllable boundary confusion often occurs when letters representing the tones are added to the syllable spellings. In fact, the Committee for the Reform of the Chinese Written Language that created Pinyin (i.e., Hanyu Pinyin, the Chinese phonetic system) once seriously considered using Western alphabets to express tones, but had to give up when they failed to solve the problem of syllable boundary confusion occurring in compound words where the syllables are joined together, and finally they turned back to the traditional tone marks "-, ／, ∨, ＼" and put them directly on top of the letters of the Western alphabets. As regards the HLV Pinyin input method previously mentioned, it selects the three letters h, l and v to represent the tones, but syllable boundary confusion occurs. To remedy the confusion, additional letters need to be used to represent the four tones when confusion occurs, so in addition to the letters h, l and v, extra letters y, w, r and k are used to represent the tones, making the system very complicated. Six years later, "an improved HLV Pinyin input method" was launched with the addition of radical codes. More than 240 radicals are set for this method, each having its own code of representation. This method solves the problem of repeated code thoroughly, but it becomes even more complex than before and is very difficult to learn, so there is no market for it.

Therefore, the problem of "using Western alphabets to express tones will result in syllable boundary confusion in compound words" has always been there. Through logical reasoning, this invention figures out that if "the three keys j, q and x are used to input three of the four tones, and "no entry" is used to input the remaining one", the usual syllable boundary confusion occurring when syllables are joined together will disappear, that is, as long as the appropriate letters are selected, the problem can be solved. Therefore, the creativity of this invention is obvious. Moreover, the three letters j, q, and x inferred by this invention have never been used to represent tones before, so this invention also satisfies the requirements on novelty.

Next, the contribution of this invention to the technical field of Chinese input method will be investigated. This invention should not be compared with the five-stroke input method, because five-stroke input method does not belong to the category of Pinyin input methods. As for HLV Pinyin input method, there is no market for it at present, and it has been pointed out above that it makes use of radicals of Chinese characters for its input and is far more complex and difficult to learn in comparison with other Pinyin input methods. Therefore, this invention is only suitable for comparison with the world's most popular Pinyin input methods at present.

Until now, a keyboard that can type out Pinyin containing tones has not yet been developed around the world. At present, the most popular Pinyin input methods are mainly developed by large companies, including Baidu, Sogou, Tencent QQ, Microsoft and Google, and the users have to select Chinese characters or words immediately after inputting syllable spellings without tone. If a user needs to input a compound word, he/she has two options, one option is to select the Chinese character immediately after inputting one syllable without tone, and the other option is to select the Chinese word after inputting all its syllables without tone. In general, the computer displays about five Chinese characters or words for him/her to choose from each time, and a key has to be pressed to display another five Chinese characters or words, and so on.

Mandarin has only about 410 syllables not containing tones, but there are more than 3,000 commonly used Chinese characters, so when selecting a Chinese character after inputting its syllable without tone, the user has to face an average of about 8 different commonly used Chinese characters to choose from (3300÷410, assuming there are a total of 3,300 commonly used Chinese characters). However, if the user uses this invention, in view that there are about 1,300 syllables containing tones, he/she will face an average of 3,300÷1300 Chinese characters to choose from after inputting the syllable containing tone, that is, the candidate Chinese characters are reduced from 8 to 2.5, less than one-third of the case without tone.

This difference may be explained by taking the syllable "chang" as an embodiment. If the user uses a general Pinyin input method to input the syllable without tone, the number of commonly used Chinese characters to choose from is about 9 as shown below:

长 (cháng), 唱 (chàng), 常 (cháng), 昌 (chāng), 尝 (cháng), 畅 (chàng), 场 (chǎng), 厂 (chǎng), 娼 (chāng)

But if the user uses the method of this invention to input the syllable containing tone, the number of commonly used Chinese characters to choose from will be significantly reduced to 2.25 (9÷4), that is, one-fourth of the commonly used Chinese characters without tone. In this embodiment, the number of candidate Chinese characters is less than the overall average number of 2.5 derived above, because every tone of "chang" contains commonly used Chinese characters so that the 9 commonly used Chinese characters are shared among the 4 tones of "chang" (Note that if only three tones of "chang" contained commonly used Chinese characters, then the average number would increase to 3). The 9 commonly used Chinese characters of the toneless "chang" are shared by the 4 tones as follows:

Chang: 昌 (chāng), 娼 (chāng)

Changj: 长 (cháng), 常 (cháng), 尝 (cháng)

Changq: 场 (chǎng), 厂 (chǎng)

Changx: 唱 (chàng), 畅 (chàng)

The said theory and embodiment above indicate: For a monosyllabic word entered with the method of this invention, the average number of commonly used Chinese characters for the user to choose from is much less than that entered with a general (current) Pinyin input method. By the method of this invention, the user only needs to choose from an average of 2.5 commonly used Chinese characters.

Below is a further discussion about the difference between this invention and the general Pinyin input methods in terms of Chinese word selection when a disyllable (disyllabic compound word) is inputted. The disyllable "yishi" is taken as an embodiment for illustration. If the user uses a general Pinyin input method to input the disyllable "yishi" without tone, the number of commonly used Chinese words to choose from is about 17, as shown below:

医师 (yīshī), 一十 (yīshí), 衣食 (yīshí), 依时 (yīshí), 伊始 (yīshǐ), 衣饰 (yīshì), 一试 (yīshì), 遗失 (yíshī), 仪式 (yíshì), 疑是 (yíshì), 已是 (yǐshì), 以示 (yǐshì), 已逝 (yǐshì), 意识 (yìshí), 议事 (yìshì), 轶事 (yìshì), 义士 (yìshì)

Now, if he/she uses the method of this invention to input this disyllable with tone, what would be the average number of commonly used Chinese words for him/her to choose from? For a disyllable, each syllable has four tones at most, so there are up to 16 tone combinations (4×4) for the disyllable with tone. If every such tone combination contains commonly used Chinese words, then the average number of commonly used Chinese words for the user to choose from can be as low as 1.06 (17÷16), but this is very rare. For this embodiment "yishi", there are only 9 tone combinations containing commonly used Chinese words to choose from, so the average number of commonly used Chinese words for the user to choose from is only 1.9 (17÷9), that is, for a disyllable entered with tones with the method of this invention, the average number of commonly used Chinese words for the user to choose from is significantly reduced to only one-ninth of that for the disyllable entered with the general Pinyin input methods without tones (This is only the average number for the 9 combinations in this embodiment, rather than the overall average).

The distribution of the 17 commonly used Chinese words among the 9 tone combinations is given below:

yishi: 医师 (yīshī)

yishij: 一十 (yīshí), 衣食 (yīshí), 依时 (yīshí)

yishiq: 伊始 (yīshǐ)

yishix: 衣饰 (yīshì), 一试 (yīshì)

yijshi: 遗失 (yíshī)

yijshix: 仪式 (yíshì), 疑是 (yíshì)

yiqshix: 已是 (yǐshì), 以示 (yǐshì), 已逝 (yǐshì)

yixshij: 意识 (yìshí)

yixshix: 议事 (yìshì), 轶事 (yìshì), 义士 (yìshì)

Through comparing the above two embodiments, it can be seen that this invention plays a much greater and more effective role in disyllables than in monosyllables. In view of this, although this invention can be used to choose from both Chinese characters and Chinese words, the user is still encouraged to choose from Chinese words after inputting the syllables containing tones, rather than to choose from Chinese characters. Moreover, in this way, the user not only enjoys the said benefits above, but can also reduce the frequency of making selections, because for any piece of Chinese writing, the number of Chinese words in it must be less than the number of Chinese characters. The following is a paragraph of Chinese text randomly selected as an embodiment to compare the frequency of making character selections with the frequency of making word selections.

This paragraph has a total of 114 Chinese characters: [国民政府于1928年颁布的《国语罗马字》,设计者是当时最负盛名的学者,包括赵元任,林语堂和钱玄同。他们没有使用中国人长久以来一直使用的声调符号,而以音节拼写的变化来表达声调。但是他们设计的系统,变化相当复杂,尽管得到政府的全力支持,民众却反应冷淡,始终未能成功。(Corresponding Pinyin: Guómín zhèngfǔ yú 1928 nián bānbùde "Guóyǔ Luómǎ. Zì", Shèjìzhě shì dāngshí zuì fù shèngmíngde xuézhě, bāokuò Zhào Yuánrèn, Lín Yǔtáng hé Qián Xuántóng, Tāmen méiyǒu shǐyòng zhōngguórén chángjiǔ yǐlái yīzhí shǐyòngde shēngdiào fúhào, ér yǐ yīnjié pīnxiě de biànhuà lái biǎodá shēngdiào. Dànshì tāmen shèjìde xìtǒng, biànhuà xiāngdāng fùzá, jìnguǎn dédào zhèngfǔde quánlì zhīchí, mínzhòng què fǎnyìng lěngdàn, shǐzhōng wèi néng chénggōng.)]

This paragraph is rewritten below using the tone notation of this invention: [Guojminj Zhengxfuq yuj 1928 nianj banbuxde "Guojyuq Luojmaq Zix", shexjixzheq shix dangshij zuix fux shengxmingjde xuejzheq, baokuox Zhaox Yuanjrenx, Linj Yuqtangj hej Qianj Xuanjtongj. Tamenj meijyouq shiqyongx zhongguojrenj changjjiouq yiqlaij yizhij shiqyongxde shengdiaox fujhaox, erj yiq yinjiej pinxieq de bianxhuax laij biaoqdaj shengdiaox. Danxshix tamenj shexjixde xixtongq, bianxhuax xiangdang fuxzaj. Jinxguanq dejdaox zhengxfuqde quanjlix zhichij, minjzhongx quex fanqyingx lengqdanx, shiqzhong weix nengj chengjgong.]

This paragraph has a total of only 62 Chinese words. That is, to input the same paragraph, the user needs to stop 114 times to make character selections, but stop only 62 times to make word selections. So, considerable time can be saved if the user chooses to make word selections.

In conclusion, the contributions made by this invention to the technical field of Chinese input method are as follows:

(1) Until now, a keyboard that can type out Pinyin containing tones has not yet been developed around the world. This invention enables input of Pinyin containing tones via a common keyboard and thus solves the problem.

(2) Through inputting the tones of Mandarin, this invention greatly reduces the code repetition rate. When this invention is used to input a monosyllable with tone, the user only needs to choose from an average of 2.5 commonly used Chinese words, much less than the average number of 8 if the monosyllable is inputted with the current Pinyin input methods not containing tones. The ratio is 1:3.2.

(3) With the option of "selection of Chinese words containing tones rather than characters", this invention can further reduce the code repetition rate. When this invention is used to input a disyllable or polysyllable with tones, the number of commonly used Chinese words to choose from is even much further reduced compared with the input without tones by the current Pinyin input methods. In the embodiment of "yishi" (a disyllable), the two numbers are 1.9 and 17. The ratio is 1:9.

(4) At present, users of the general Pinyin input methods mainly use Chinese character selection, whereas this invention especially benefits users who use Chinese word selection. Chinese word selection can reduce the frequency of making selections, thus enhancing the input speed. In the last embodiment (a paragraph of Chinese text), the user stops 62 times for Chinese word selection, but stops 114 times for Chinese character selection. So the difference is significant.

(5) This invention uses Western alphabet spellings to express both the syllables and the tones of Mandarin, and thus it can express completely all the speech sounds of Mandarin. For any person speaking standard Mandarin, no matter what he/she says, his/her full speech can be completely recorded by the method of this invention, and anyone familiar with this invention can read the record and knows at once what he/she has said without listening to his/her speech. Thus, reading Western alphabet spellings is then equivalent to listening to Mandarin. In this way, coupled with computer intelligence technology, a computer software application that converts Western alphabet spellings representing Chinese words, sentences, paragraphs and articles into Chinese characters or voice can be easily produced.

Finally, it should be noted that this invention does not include the way to deal with the light tone, because when this invention is used, the light tone can be handled according to the rules and methods specified in the current Pinyin system, which is, of course, not a part of this invention.

What is claimed is:

1. A Chinese input method using Pinyin plus a new tone notation, operated on a Western keyboard or keypad to input Chinese words in terms of Chinese characters, such that after a user inputs a Chinese word containing one or several syllables and tones by keying in a series of letters representing the syllables and the tones of the word, the letters are all joined together but do not cause any confusion, wherein the input method comprises the steps of:

providing the Western keyboard or keypad used to key in all the letters used by a Pinyin System;

providing a computer software for inputting Chinese via using the Western keyboard or keypad, the computer software being configured such that the three keys j, q and x, are used to input three of the four tones of Putonghua or Mandarin while "no entry" is used to input the remaining tone, wherein said computer software, making use of the fact that said Chinese input method allows the letters, representing the syllables and tones of the word, to be all joined together without causing any confusion, is also configured such that after a Chinese word containing several syllables and tones is inputted, a computer screen instantaneously displays, in terms of Chinese characters, a list of commonly used Chinese words that have the same sound and the same tone as the inputted word for the user to select;

using the Western keyboard or keypad to input a syllable without tone of a first Chinese character of the Chinese word;

after the syllable without tone of the first Chinese character is inputted, inputting a tone of the first Chinese character by keying in one of the letters j, q and x, or by "no entry", thereby generating the syllable and the tone of the first Chinese character;

if the Chinese word has only one character, terminating input process of the input method;

if the Chinese word contains more than one character, repeating the step of generating the syllable and the tone of the first Chinese character, which comprises inputting a syllable without tone of a second Chinese character of the Chinese word, followed by inputting a tone of the second Chinese character by keying in j, q or x, or by "no entry", to thereby generate the syllable and the tone of the second Chinese character;

repeating the steps above until the syllables and tones of all the characters of the Chinese word are inputted;

selecting a suitable Chinese word from the list of corresponding commonly used Chinese words already displayed on the computer screen in terms of Chinese characters.

2. The Chinese input method according to claim 1, wherein "no entry" is used to express the first tone (level tone) of Putonghua or Mandarin, the key j is used to input the second tone (rising tone) of Putonghua or Mandarin, the key q is used to input the third tone (falling-rising tone) of Putonghua or Mandarin and the key x is used to input the fourth tone (falling tone) of Putonghua or Mandarin.

3. The Chinese input method according to claim 1, wherein said input method further comprises the step of:
using a plurality of the Chinese words containing tones, which are monosyllables, disyllables or polysyllables, to constitute a sentence or a paragraph containing several sentences, wherein the syllables containing tones in every word of the entire sentence or paragraph are joined together without causing any confusion.

4. The Chinese input method according to claim 2, wherein said input method further comprises the step of:
using a plurality of the Chinese words containing tones, which are monosyllables, disyllables or polysyllables, to constitute a sentence or a paragraph containing several sentences, wherein the syllables containing tones in every word of the entire sentence or paragraph are joined together without causing any confusion.

5. The Chinese input method according to claim 1, wherein said input method further comprises the step of:
when the Western keyboard or keypad is used to input the syllables of the Chinese characters, using letters e and v to substitute the two letters e and ii respectively in the Pinyin System, wherein the substitution enables implementation of the input method on a pure English keyboard.

6. The Chinese input method according to claim 2, wherein said input method further comprises the step of:
when the Western keyboard or keypad is used to input the syllables of the Chinese characters, using letters e and v to substitute the two letters e and ii respectively in the Pinyin System, wherein the substitution enables implementation of the input method on a pure English keyboard.

* * * * *